No. 722,445. PATENTED MAR. 10, 1903.
E. M. BOYNTON.
EMBANKMENT PROTECTOR.
APPLICATION FILED AUG. 2, 1902.
NO MODEL. 2 SHEETS—SHEET 2.
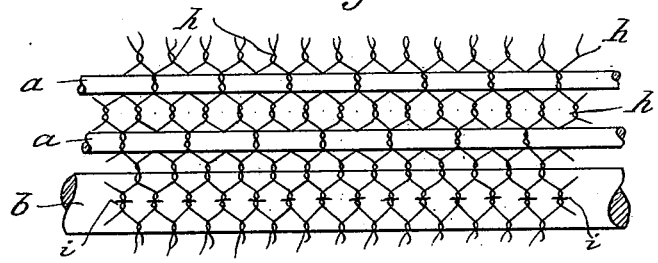
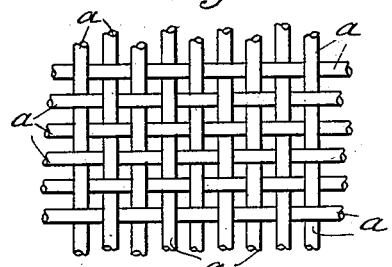
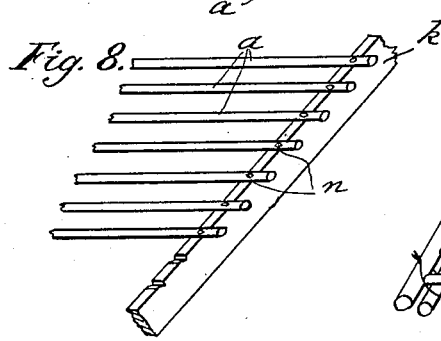
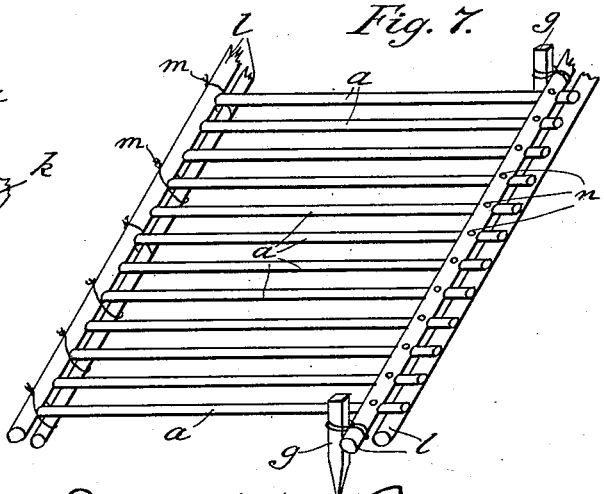
WITNESSES: INVENTOR
D. C. Reusch Eben Moody Boynton
Annie E. Brown

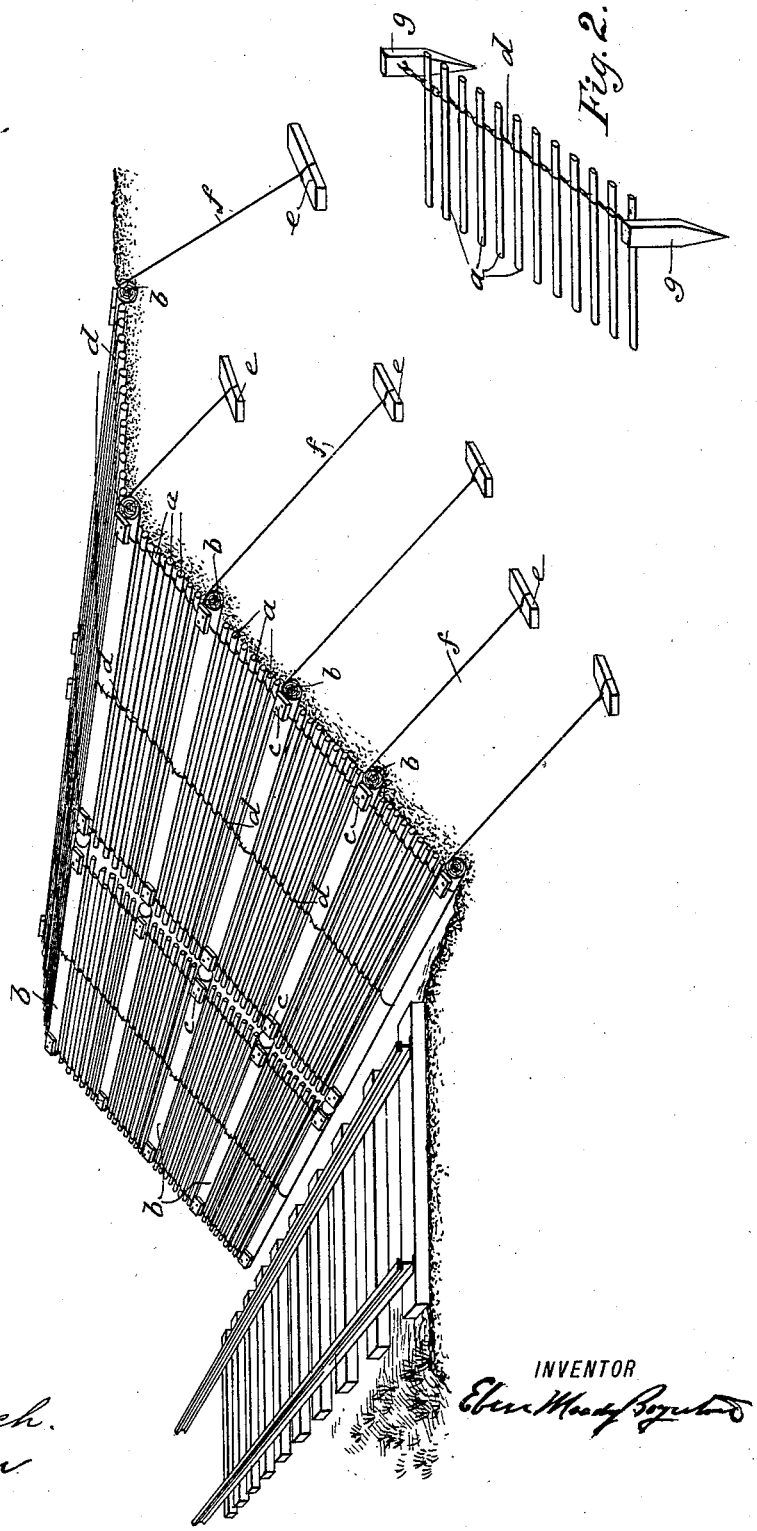
No. 722,445.  
PATENTED MAR. 10, 1903.  
E. M. BOYNTON.  
EMBANKMENT PROTECTOR.  
APPLICATION FILED AUG. 2, 1902.  
NO MODEL.  
2 SHEETS—SHEET 1.

United States Patent Office.

EBEN MOODY BOYNTON, OF WEST NEWBURY, MASSACHUSETTS.

EMBANKMENT-PROTECTOR.

SPECIFICATION forming part of Letters Patent No. 722,445, dated March 10, 1903.

Application filed August 2, 1902. Serial No. 118,158. (No model.)

*To all whom it may concern:*

Be it known that I, EBEN MOODY BOYNTON, of West Newbury, in the county of Essex and State of Massachusetts, have invented a new and useful Improvement in Embankment-Protectors, of which the following, taken in connection with the accompanying drawings, is a specification.

My invention relates to the protection and preservation of railroad-banks or shores of dams, canals, lakes, &c., against the effects of washouts, rains, or the action of waves or storms, of which the following is a description and specification, reference being had therein to the accompanying drawings.

The object of the invention is to produce such a surface on embankments or similar slanting earth walls that running water shall be unable to dislodge the surface particles of sand and stone, and thereby either gradually or under other circumstances in a few moments transfer such surface particles to a lower level—such as, for instance, of a railroad-track—where it not alone may cause great inconvenience and expense in removing it, but, as often happens, be the direct cause of great loss of life. This refers also to the banks of canals, dams, and river-fronts, where also during spring freshets the banks are liable to be slowly washed away and cause floods in the surrounding country. I prevent this gradual or sudden disintegration by imitating nature's methods when it wishes to obtain the same results—that is, by producing a mat of living green vegetation, bushes, or shrubs the roots of which are so tightly interlaced that even the smallest particles of earth are gripped and held in such a manner that running water is unable to remove it. I produce these living vegetable mats by depositing on the surface a network of living willow sticks or other sticks that will easily grow and set roots in the ground provided for it. This network is then covered with earth to provide it with the necessary conditions for growth. The special claims of my invention refer to the means whereby said willow sticks are connected with each other and with other logs or posts to keep them securely anchored while they are in the process of growing, and thus prevent their washing away before they have been able to secure themselves by deep roots. As such mats may at most places where they are to be placed be difficult to obtain, I desire also to provide means whereby these mats can be manufactured cheaply and on a large scale in a form that will allow them to be easily transported and deposited on the desired places.

Figure 1 is a perspective view showing a railroad-track with an embankment, the latter being covered with a series of sticks that are connected with each other and with intervening logs by means of metal wire. Fig. 2 is a perspective detail view where the sticks are inserted in the links of a chain and the ends of the chain fastened to posts that may be inserted in the ground. Fig. 3 is a partial cross-section of Fig. 1, showing the method of lacing the sticks together by means of metal wires. Fig. 4 shows another method of securing the sticks in position. In this view ordinary wire fencing is used, in whose meshes the sticks are inserted, the fencing itself being nailed at intervals to larger logs. Fig. 5 is a cross-section of Fig. 4. In Fig. 6 the sticks themselves are woven together, thereby holding themselves mutually in position. In Fig. 7 some vertical stakes are used to retain the sticks in their position, and in Fig. 8 a plank is used for the same purpose.

In all the figures, $a$ represents the willow sticks, and $b$ the larger logs that hold them in position.

In Fig. 1 the sticks $a$ are laced together by means of the metallic wires or fibrous cords $d$, as shown more fully in Fig. 3. These wires or cords pass over the logs $b$, where blocks $c$ are nailed down to retain the wires in position. There are seen to be two series of sticks, each held by three lines of wire. This series can be added to, depending on the length of the embankment, each series being short enough to be easily handled and transported. In order to keep the logs $b$ in position, iron bars or stones $e$ have been embedded in the ground and connected to logs $b$ by means of cables $f$.

It should be understood that all the figures represent the sticks and logs in position ready to be covered with earth, but that the latter has been left out in order to show the constituent element of the mats.

In some cases the logs $b$ may be omitted and stakes $g$ inserted in the ground, as shown in Fig. 2, where the wire also has been replaced by a chain in whose links the sticks have been inserted. Where shorter sticks are to be utilized, it may be of advantage to use something like the wire-netting or fibrous netting shown in Fig. 4, where sticks may be inserted any place in the meshes and held in their proper place. The netting itself is held to the larger log $b$ by means of staples $i$. The relation between sticks and log is also shown in Fig. 5, which is a cross-section of Fig. 4.

When it is desirable to use numerous small fibers, then they may be held in position by being woven together in the manner shown in Fig. 6.

The methods of restraining the fibers and sticks from motion that were shown in Figs. 1, 2, 3, 4, and 5 may also be dispensed with and those shown in Figs. 7 and 8 used in their place. In Fig. 7 logs $l$ are used. They are scribed to receive the sticks $a$ and are then held together either by means of loops of rope or wires $m$ or by means of spikes $n$. They may be tied to stakes $g$, driven in the ground. In Fig. 8 a plank $k$ has been scribed in a similar manner and spikes $n$ driven through the sticks $a$ to retain them in their places.

I claim—

1. The herein-described means for protecting embankments or shores from erosion which consists of rods, stems or cuttings of live wood laid down upon and so far bedded into the soil of such embankments or shores as to sprout and take root therein, substantially as set forth.

2. The herein-described means of preventing erosion of embankments or shores which consists in hedges grown from rods, stems or cuttings of live wood, laid down upon and bedded into the soil of said embankments or shores.

3. A protection for embankments consisting of a plurality of rods, stems, or cuttings of live wood laid side by side upon such embankment and substantially transverse to the direction of flow of the eroding waters.

4. A protection for embankments consisting of rods, stems or cuttings of live wood laid down upon such embankment, and so united together as to be retained in given relative position substantially as set forth.

5. The combination with supports of larger dimensions laid upon and embedded in the embankment of rods, stems, or cutting of live wood, disposed adjacent thereto, and means for tying or uniting the latter to the former, substantially as described.

6. The combination of branches or sticks of live wood with each other, in such manner as to constitute a mat capable of being transported to position, and bedded upon an embankment so as to take root thereon.

7. The combination with a mat formed of connected stems or sticks of live wood of anchorage adapted to be sunk in an embankment.

8. The combination with branches or sticks of live wood, of wires or cords connecting said sticks together to form a mat substantially as described.

EBEN MOODY BOYNTON.

Witnesses:
ANNIE E. BROWN,
SARAH E. MULLIKEN.